United States Patent [19]
Wherry

[11] 3,848,915
[45] Nov. 19, 1974

[54] TREE BALLING SPADE

[76] Inventor: Bernard Wherry, c/o Wherry Nurseries, St. Marys, W. Va. 26170

[22] Filed: Jan. 3, 1973

[21] Appl. No.: 320,762

[52] U.S. Cl. .................................. 294/49, 294/57
[51] Int. Cl. ............................................. A01b 1/02
[58] Field of Search ........ 294/49, 55, 57, 60; 7/1 L, 7/14.55

[56] References Cited
UNITED STATES PATENTS

| | | | |
|---|---|---|---|
| 648,321 | 4/1900 | Westerberg | 294/49 |
| 809,840 | 1/1906 | Peisker | 294/49 |
| 1,263,949 | 4/1918 | Singer | 294/49 |
| 1,545,770 | 7/1925 | Hokanson | 294/57 |
| 2,075,277 | 3/1937 | Finkes | 294/57 |
| 2,247,958 | 7/1941 | Maxcy | 294/49 |

Primary Examiner—Richard A. Schacher
Assistant Examiner—Johnny D. Cherry
Attorney, Agent, or Firm—Blair & Brown

[57] ABSTRACT

A tree balling spade having a blade with a length approximately one and one half times its width with the side edges of the blade arcuately curved to an entering point. The complete side edges of the blade from the back edge of the blade to the point are sharpened to provide cutting edges. The back edge of the blade is provided with upwardly offset extensions for engagement of the foot of the user. The handle of the spade consists of a pair of straps welded to the blade and shaped to surround a generally cylindrical curved wooden handle having a stirrup handgrip at the outer end thereof. The straps are riveted to the wooden handle by rivets which extend through the wooden handle. The blade is concavely curved from side to side.

1 Claim, 3 Drawing Figures

TREE BALLING SPADE

BACKGROUND OF THE INVENTION

1. Field of the Invention

The present invention relates to tree balling spades for digging a tree with a ball of earth attached to the roots thereof.

2. Summary of the Invention

The present invention includes a blade having arcuate sharpened edges meeting in a point at the lower end of the blade. The blade is concavely curved from side to side and has a length approximately one and one half times its width. A handle is provided for the blade consisting of a pair of straps welded to the blade and formed around a generally cylindrical wooden handle which is curved to attach to the blade. The upper end of the wooden handle is provided with a stirrup handgrip. Integral offset portions are formed on the back edge of the blade for engagement by the foot of the user.

The primary object of the invention is to provide a tree balling spade which will form the ball of dirt surrounding the tree roots as the tree is dug from the ground.

Other objects and advantages will become apparent in the following specification when considered in the light of the attached drawings.

DESCRIPTION OF THE PREFERRED EMBODIMENT

Figure 1:
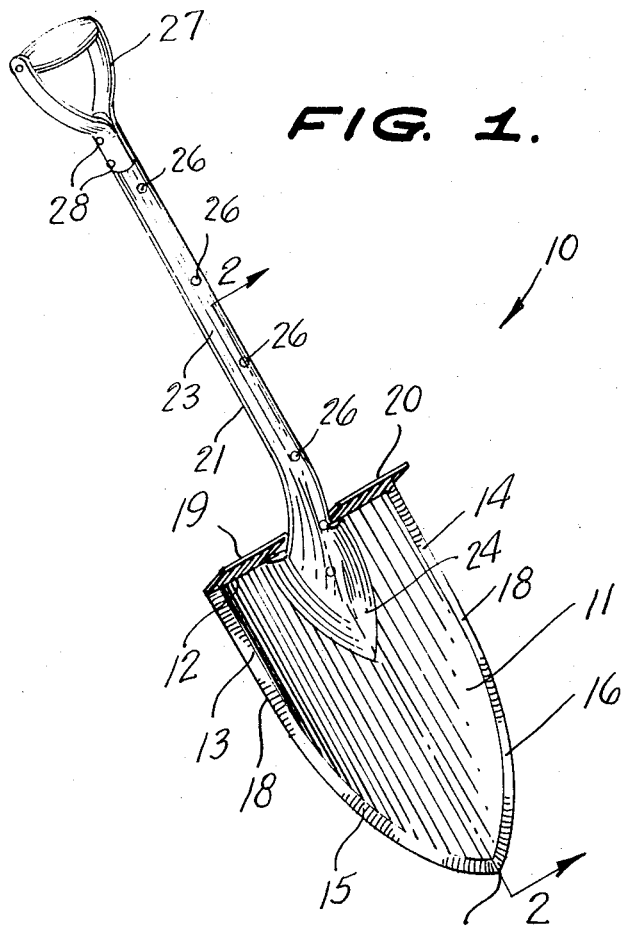
FIG. 1 is a perspective view of the invention.
Figure 2:
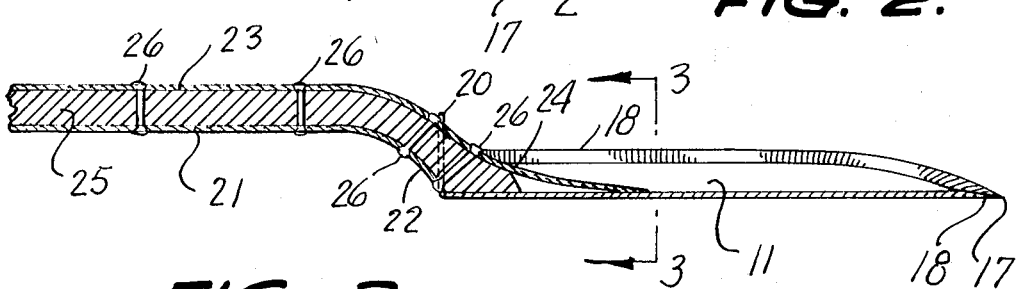
FIG. 2 is an enlarged fragmentary longitudinal sectional view, taken along the line 2—2 of FIG. 1, looking in the direction of the arrows.
Figure 3:
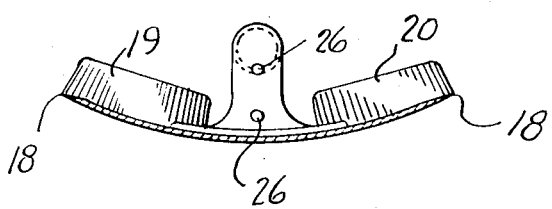
FIG. 3 is a transverse sectional view, taken along the line 3—3 of FIG. 2, looking in the direction of the arrows.

Referring now to the drawings in detail, wherein like reference characters indicate like parts throughout the several figures, the reference numeral 10 indicates generally a tree balling spade constructed in accordance with the invention.

The tree balling spade 10 includes a relatively thin concavely curved blade 11 having a back edge 12 and spaced parallel side edges 13, 14 blending into curved forward edges 15, 16 respectively which terminate in a point 17. A continuous sharpened edge 18 extends along both side edges 13, 14 and forward edges 15, 16 from the rear edge 12.

A pair of foot engaging plates 19, 20 of generally rectangular form extend integrally upwardly from the blade 11 at the rear edge 12 thereof transversely of the blade 11 to provide an engaging plate for the foot of the user.

An arcuate metallic plate 21 is joined to the blade 11 by welding or the like at 22. A second arcuate plate 23 is provided with an arrowhead shape extension 24 which engages the concave surface of the blade 11 and is secured thereto by welding or the like. A generally cylindrical wooden handle 25 is positioned between the plates 21, 23 and a plurality of rivets 26 extend through the plates 21, 23 and through the wooden handle 25 to bind them together in a rigid relationship.

A stirrup handgrip 27 is secured to the outer end of the wooden handle 25 by rivets 28 as can be seen in FIG. 1.

The blade 11 of the spade 10 has a length from the back edge 12 to the point 17 approximately one and one half times as great as the distance between the side edge 13 and the side edge 14 adjacent the back edge 12.

In the use and operation of the invention the tree balling spade 10 is pressed into the earth substantially vertically adjacent a tree to be moved, by pressing the foot downwardly on the plates 19, 20 so that the point 17 is pressed downwardly into the ground. The complete cutting edge 18 cuts through any minor roots that may be in the path of the blade 11. The blade 11 is then withdrawn and moved to a new position adjacent to that already dug and again is pressed into the earth in the same manner. This is continued until a complete line has been dug surrounding the tree in order to form a ball of earth to be removed from the ground with the tree as the tree is dug.

Having thus described the preferred embodiment of the invention it should be understood that numerous structural modifications and adaptations may be resorted to without departing from the spirit of the invention.

I claim:

1. In a tree balling spade, a relatively thin concave blade having a transverse back edge and spaced parallel side edges blending into curved forward edges that terminate in a point, a continuous sharpened edge extending along both side edges and forward edges from the rear edge, a pair of foot engaging plates of generally rectangular formation integrally formed on the back edge of said blade and extending generally perpendicularly upwardly from said blade, a first arcuate metallic plate secured to said blade by welding, a second arcuate metallic plate provided with an arrowhead extension that engages the concave surface of the blade and is secured thereto, a generally cylindrical handle having a portion thereof positioned between said arcuate plates, securing elements extending through said arcuate plates and said handle for securing said handle to said blade, and a stirrup handgrip rigidly secured to the outer end of said handle, said first and second arcuate metallic plates extending from said handgrip to said blade, the blade of the spade having a length from the back edge to the point on the front approximately one and one half times as great as the distance between the pair of side edges adjacent the back edge.

\* \* \* \* \*